US012607318B2

(12) United States Patent
Jung et al.

(10) Patent No.: US 12,607,318 B2
(45) Date of Patent: Apr. 21, 2026

(54) LIGHTING DEVICE WITH A HIGH-BEAM MODULE

(71) Applicant: ZKW Group GmbH, Wieselburg (AT)

(72) Inventors: Mongkwon Jung, Kimpo-si (KR); Donghyun Go, Incheon (KR); Dominic Gottsman, Waasen (AT); Nina Brauner, Altlengbach (AT); Namseok Oh, Goyang-si (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/267,021

(22) Filed: Jul. 11, 2025

(65) Prior Publication Data

US 2026/0022811 A1 Jan. 22, 2026

(30) Foreign Application Priority Data

Jul. 17, 2024 (EP) .................................... 24189169

(51) Int. Cl.

*F21S 41/24* (2018.01)
*F21S 41/147* (2018.01)

(Continued)

(52) U.S. Cl.

CPC ............. *F21S 41/24* (2018.01); *F21S 41/147* (2018.01); *F21S 41/25* (2018.01); *F21S 41/663* (2018.01);

(Continued)

(58) Field of Classification Search

CPC ...... B60Q 1/04; B60Q 1/0041; B60Q 1/0058; F21S 41/24; F21S 41/25; F21S 41/663; F21S 41/147; F21Y 115/10

See application file for complete search history.

(56) References Cited

U.S. PATENT DOCUMENTS 11,668,445 B2 * 6/2023 Stormberg ............ F21S 43/239 362/511
11,703,201 B2 * 7/2023 Kikuchi .................. F21S 41/24 362/618

(Continued)

FOREIGN PATENT DOCUMENTS

DE 202023104597 U1 9/2023
EP 3329179 B1 5/2019

(Continued)

OTHER PUBLICATIONS

The extended European search report for European application No. EP24189169, dated Nov. 7, 2024.

*Primary Examiner* — William J Carter
(74) *Attorney, Agent, or Firm* — Quinn IP Law

(57) ABSTRACT

The invention relates to lighting device (1) for a vehicle with at least one high-beam lighting module (10), wherein a high-beam lighting module (10) comprises at least one high beam light source (101), a primary optical system (102), and a secondary optical system (103), which is arranged downstream of the primary optical system (102) in the direction of light propagation. The secondary optical system (103) comprises an inner boundary surface (103*a*) facing the primary optical system (102) and an outer boundary surface (103*b*) facing away from the primary optical system (102). Light emitted by the at least one light source (101) is coupled into the primary optical system (101), which is configured to emit the in-coupled light onto inner boundary surface (103*a*) of the secondary optical system (103), which secondary optical system (103) projects said light as a light distribution (HLV) into a region in front of the lighting device (1). The primary optical system (102) and the secondary optical system (103) are configured such that the light distribution (HLV) forms a part of a high-beam (HB) or adaptive driving beam, ADB, light distribution.

(Continued)

Figure 1:
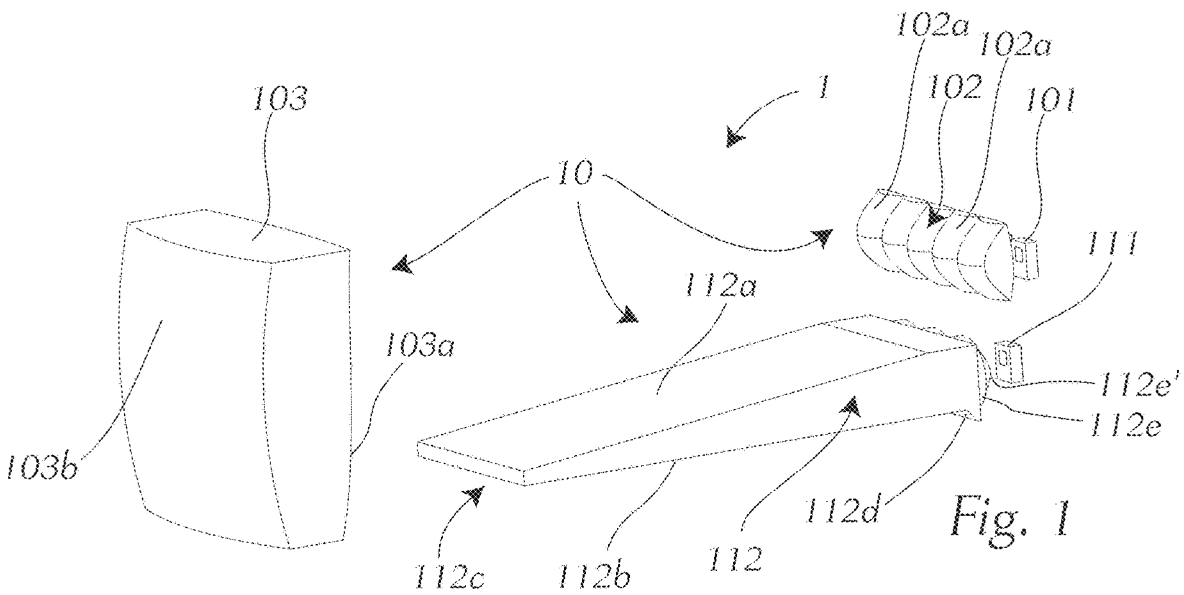

The high-beam module (10) comprises at least one additional light source (111), and an optical transparent light guide body (112), wherein the at least one additional light source (111) can be controlled independently of the at least one light source (101), and wherein the at least one additional light source (111) is configured to couple light into the optical transparent light guide body (112), which optical transparent light guide body (112) is arranged in front of the secondary optical system (103) in the direction of light propagation, wherein the optical transparent light guide body (112) is configured to emit at least part of the light coupled into the optical transparent light guide body (112) onto the inner boundary surface (103*a*) of the secondary optical system (103), so that the secondary optical system (103) illuminates when viewed from an outside of the lighting device (1) when the at least one high beam light source (101) is switched off.

15 Claims, 4 Drawing Sheets

(51) Int. Cl.

| | |
|---|---|
| ***F21S 41/25*** | (2018.01) |
| ***F21S 41/663*** | (2018.01) |
| ***F21Y 115/10*** | (2016.01) |
| *F21W 102/155* | (2018.01) |
| *F21W 103/10* | (2018.01) |
| *F21W 103/55* | (2018.01) |

(52) U.S. Cl.
CPC ... *F21W 2102/155* (2018.01); *F21W 2103/10* (2018.01); *F21W 2103/55* (2018.01); *F21Y 2115/10* (2016.08)

(56) References Cited

U.S. PATENT DOCUMENTS

| | | | | |
|---|---|---|---|---|
| 11,761,600 | B2 * | 9/2023 | Wu | F21V 7/06 362/509 |
| 11,788,702 | B2 * | 10/2023 | Suwa | F21S 41/663 362/520 |
| 2015/0226395 | A1 * | 8/2015 | Taudt | F21S 41/25 362/511 |
| 2015/0241616 | A1 * | 8/2015 | Bungenstock | G02B 6/0018 362/511 |
| 2016/0102834 | A1 * | 4/2016 | Yamada | G02B 6/0045 362/511 |
| 2016/0116666 | A1 * | 4/2016 | Sato | F21S 43/26261 362/509 |
| 2020/0032973 | A1 | 1/2020 | Renaud et al. | |
| 2023/0100039 | A1 * | 3/2023 | Nishimura | F21S 41/265 362/509 |
| 2023/0228398 | A1 * | 7/2023 | Muegge | F21S 43/239 362/511 |
| 2024/0110680 | A1 * | 4/2024 | Nam | F21S 41/25 |

FOREIGN PATENT DOCUMENTS

| | | | |
|---|---|---|---|
| EP | 3896334 | A1 | 10/2021 |
| WO | 2018069157 | A1 | 4/2018 |
| WO | 2024133349 | A1 | 6/2024 |

* cited by examiner

LIGHTING DEVICE WITH A HIGH-BEAM MODULE

The present invention relates to a lighting device for a vehicle, in particular a motor vehicle, the lighting device comprising

- at least one high-beam lighting module, wherein a high-beam lighting module comprises
  - at least one light source, a so-called high beam light source,
  - a primary optical system, and
  - a secondary optical system, for example a projection optics system, in particular a projection lens, wherein the secondary optical system is arranged downstream of the primary optical system in the direction of light propagation,
  - wherein the secondary optical system comprises an inner boundary surface facing the primary optical system and an outer boundary surface facing away from the primary optical system,
- wherein light emitted by the at least one light source is coupled into the primary optical system, which is configured to emit the in-coupled light onto inner boundary surface of the secondary optical system, which secondary optical system projects said light as a light distribution into a region in front of the lighting device,
- wherein the primary optical system and the secondary optical system are configured such that the light distribution forms a part of a high-beam or adaptive driving beam, ADB, light distribution, in particular a part of said light distribution which is located close to and above the horizontal H-H-line.

Lighting devices for motor vehicles, e.g. motor vehicle headlights, often comprise a high-beam module, which is configured to generate a high beam distribution or an ADB light distribution together with an additional low-beam module. The high-beam module is responsible for the upper area of the respective light distribution in a known manner.

When activated, the low-beam module generates a dipped/low beam light distribution with a cut-off line. Therefore, if the high-beam module is deactivated, the overall light distribution generated is a low beam light distribution. If the high-beam module is activated in addition, the above-mentioned high beam or ADB light distribution is generated.

Furthermore, the low-beam module can be configured to additionally generate a position light and/or daytime running light. This is realized by one or more separate light sources provided in the low-beam module, which is or are responsible for generating the position light and/or daytime running light. For example, a position light is realized by dimming the at least one light source responsible for the daytime running light.

The high-beam module is deactivated in position light/daytime running light mode.

The high-beam module comprises its own secondary optical system, often in the form of a projection lens, one or more high beam light sources and a primary optical system. Light emitted by the at least one high beam light source is shaped by the primary optical system and imaged by the secondary optical system in form of the upper part of the light distribution in front of the lighting device.

The high-beam module and the low beam module can be housed in a common housing or in separate housings, but regardless of this, the low beam module has its own secondary optical system and therefore does not emit light through the secondary optical system of the high-beam module.

In low beam mode or in position light/daytime running light mode, only the low-beam module is activated, the at least one high beam light source is deactivated, so that the secondary optical system of the high beam module appears dark.

However, for design reasons it is often desirable for the high beam module to appear illuminated even in low beam mode or in position light/daytime running light mode.

It is an object of the invention to provide a solution for this.

This object is achieved with a lighting device described at the beginning, wherein according to the invention

- high-beam module further comprises
  - at least one additional light source, and
  - an optical transparent light guide body,
  - wherein the at least one additional light source can be controlled independently of the at least one light source, and wherein the at least one additional light source is configured to couple light into the optical transparent light guide body, which optical transparent light guide body is arranged in front of the secondary optical system in the direction of light propagation,
  - wherein the optical transparent light guide body is configured to emit at least part of the light coupled into the optical transparent light guide body onto the inner boundary surface of the secondary optical system, so that the secondary optical system illuminates when viewed from an outside of the lighting device when the at least one high beam light source is switched off.

By activating the at least one additional light source, the secondary optical system can be illuminated when the at least one high beam light source is switched off, i.e. when the high-beam module is not intended to generate light distribution in the sense described above.

With the optically transparent light guide body, the light from the at least one additional light source is directed onto the secondary optical system and preferably illuminates it completely and uniformly, so that the secondary optical system is illuminated for an outside observer.

Preferably, the light-emitting areas of the optically transparent light guide body are arranged outside the optical axis and/or outside a focal point or a focal plane of the secondary optical system of the high-beam module, so that the light emitted by the at least one additional light source is imaged in the form of scattered light and not as a sharp light distribution.

Advantageous embodiments of the invention are described in the dependent claims.

It may be provided that the light guide body has an elongated shape with a longitudinal extension which is greater than the transverse extensions of the light guide body, wherein the longitudinal extension extends preferably in the direction of the optical axis, and wherein the light guide body is bounded in longitudinal extension by boundary surfaces, and wherein at least a part of the light which is coupled from the at least one additional light source into the light guide body propagates in the direction of a front end portion of the light guide body by means of total internal reflection, and wherein at least one of the boundary surfaces comprises decoupling structures, wherein the decoupling structures are arranged and configured in such a way that light propagating in the light guide body and striking the at least one boundary surface emerges from the light guide body and illuminates the inner boundary surface of the secondary optical system, preferably uniformly and/or the entire inner boundary surface.

Due to the elongated form and the coupling out of light over at least a part, preferably over almost the entire longitudinal extent of the light guide body, the area from which light exits and is emitted onto the secondary optical system is significantly enlarged (compared to the actual at least one high beam light source), so that a smeared, large light spot is formed in the light image.

Preferably it is provided that the light guide body is arranged below or above an optical axis of the secondary optical system, wherein preferably the light guide body is symmetrically intersected by a vertical plane in which the optical axis of the secondary optical system lies.

In particular, an arrangement below the optical axis of the secondary optical system offers the advantage that the secondary optical system is illuminated from bottom to top, so that the secondary optical system appears more evenly illuminated to the observer, who is generally located above the secondary optical system.

The symmetrical arrangement in relation to the optical axis allows symmetrical illumination on both sides of the optical axis.

It may be provided that the light guide body comprises an upper boundary surface, a lower boundary surface and a front end portion, wherein at least a part of the light which is coupled from the at least one additional light source into the light guide body propagates in the direction of the end portion by means of total internal reflection.

Preferably it is provided that, when the light guide body is arranged below the optical axis, decoupling structures are provided on the upper boundary surface, and when the light guide body is arranged above the optical axis, decoupling structures are provided on the lower boundary surface, wherein the decoupling structures are arranged and designed in such a way that light propagating in the light guide body and striking the upper or lower boundary surface emerges from the light guide body and illuminates the inner boundary surface of the secondary optical system, preferably uniformly and/or the entire inner boundary surface.

It may be provided that the light guide body tapers towards the front end portion.

Due to this shape, the total refraction angles become increasingly steeper towards the front end portion, thus compensating for the decreasing amount of light towards the end, which allows to decouple light homogeneously.

It is of advantage when the light guide body comprises a deflection section which is arranged and configured in such a way that part of the light coupled into the light guide body by the at least one additional light source an incident on the deflection section is deflected by said deflection section in the direction of the primary optical system, the primary optical system being set up to deflect at least part of these light onto the inner boundary surface of the secondary optical system.

It can be difficult to illuminate the secondary optical system completely and/or evenly with the light emitted only via the top or bottom of the light guide body. By additionally redirecting light coupled into the light guide body towards the primary optical system of the high-beam module, which in turn redirects this light at least partially towards the secondary optical system, the latter can be illuminated more completely and/or more evenly.

It may be provided that the optical axis of the secondary optical system runs through a light-emitting surface of the primary optical system.

The light guide body may comprise a light coupling-in section, via which the light emitted by the additional light source is coupled into the light guide body, the deflection section being arranged in the light coupling-in section.

Preferably, the light guide body and the primary optical system are arranged with respect to each other such that the deflecting section of the light guide body is located directly below or above the primary optical system.

Light-shading means may be provided at the end portion of the light guide body, to prevent the formation of a hot spot due to light being emitted in the end portion area. The light-shading means may be applied directly to the end portion, for example in form of an opaque mask applied to the end portion, or in form of a separate part arranged in front of the end portion.

Preferably, the lighting device further comprises at least one low-beam module which is configured to generate a light distribution with a cut-off line and/or to generate a position light and/or daytime running light, wherein when the at least one low-beam module and at least one high-beam light source of the at least one high-beam module are activated together, wherein the low-beam module is activated to generate the light distribution with cut-off line, a main beam light distribution or an ADB light distribution is generated, and wherein when the low-beam module is activated to generate the light distribution with cut-off line or the position light/daytime running light but the at least one high-beam light source is not activated, the at least one additional light source of the high-beam module is activated.

As already explained, the low-beam module can be configured to additionally generate a position light and/or daytime running light. This is realized by one or more separate light sources provided in the low-beam module, which is or are responsible for generating the position light and/or daytime running light.

For example, a specific optic is provided to generate the low-beam light distribution together with the at least one low-beam light source; at least one dedicated daytime running light source generates the daytime running light with its own optic, e.g. with one or more light guides. A position light can for example, be realized by dimming the at least one dedicated daytime running light source. The own optic for the daytime running light can for example be realized with a further light guide body which is arranged to illuminate the rear surface of a projection lens of the low beam module, in a similar arrangement as the additional light source and the light guide body the high beam module.

It may be provided that the low-beam module and the high-beam module are located in a common housing, or the low-beam module and the high-beam module are located in separate housings.

Further, the invention relates to a vehicle headlight, in particular a motor vehicle headlight, comprising at least one lighting device as described above.

Figure 2:
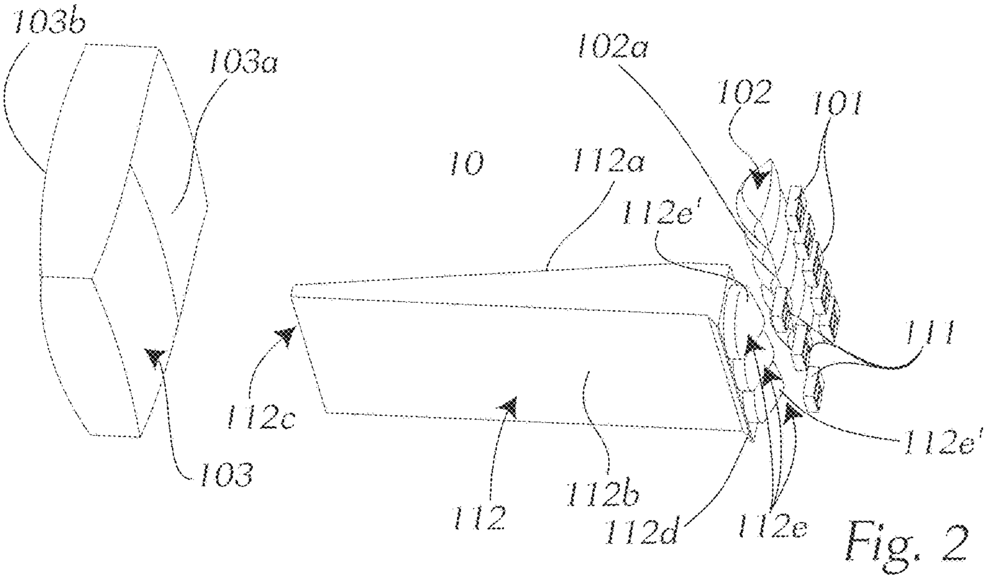
Figure 3:
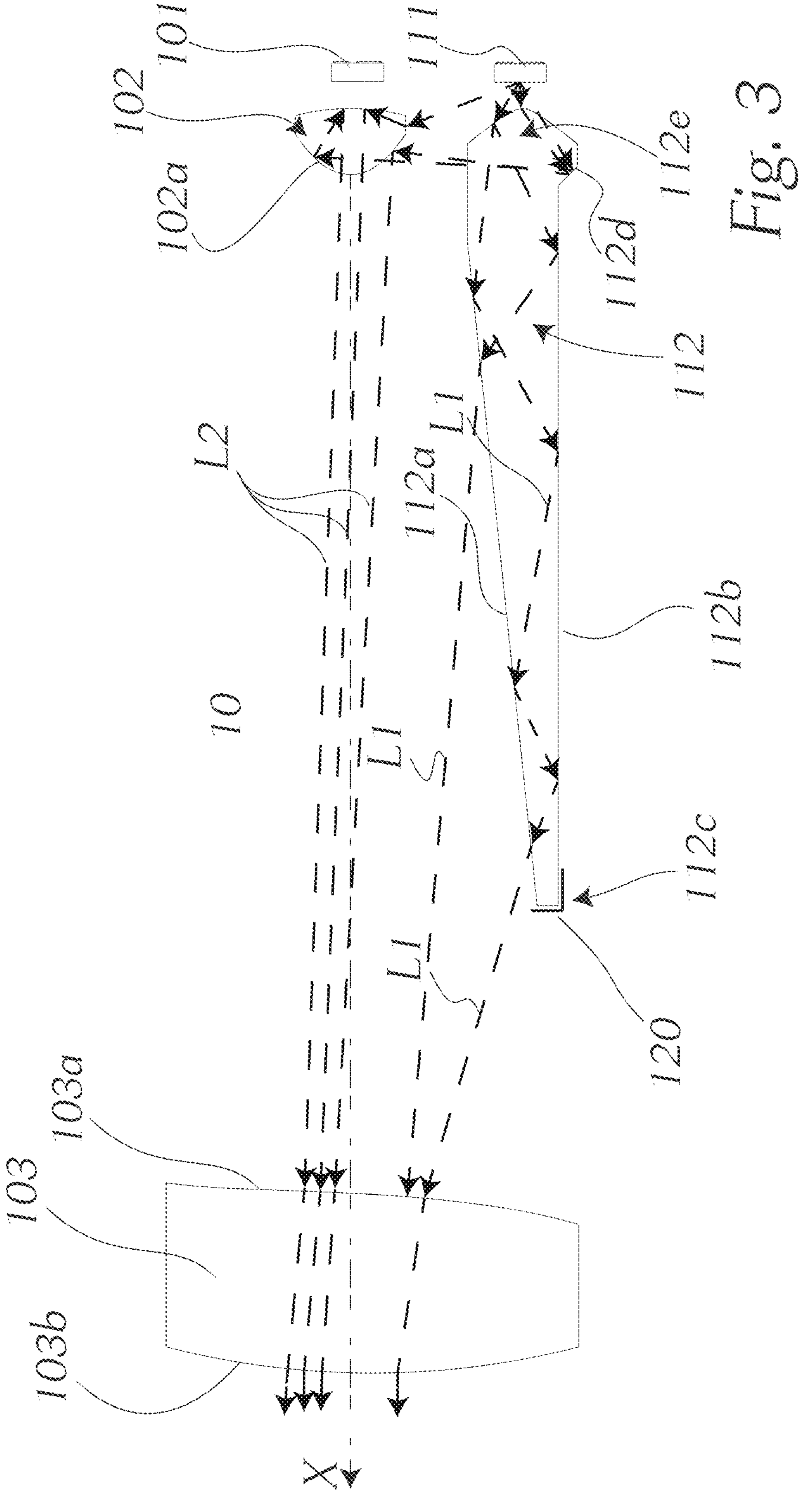
Figure 4:
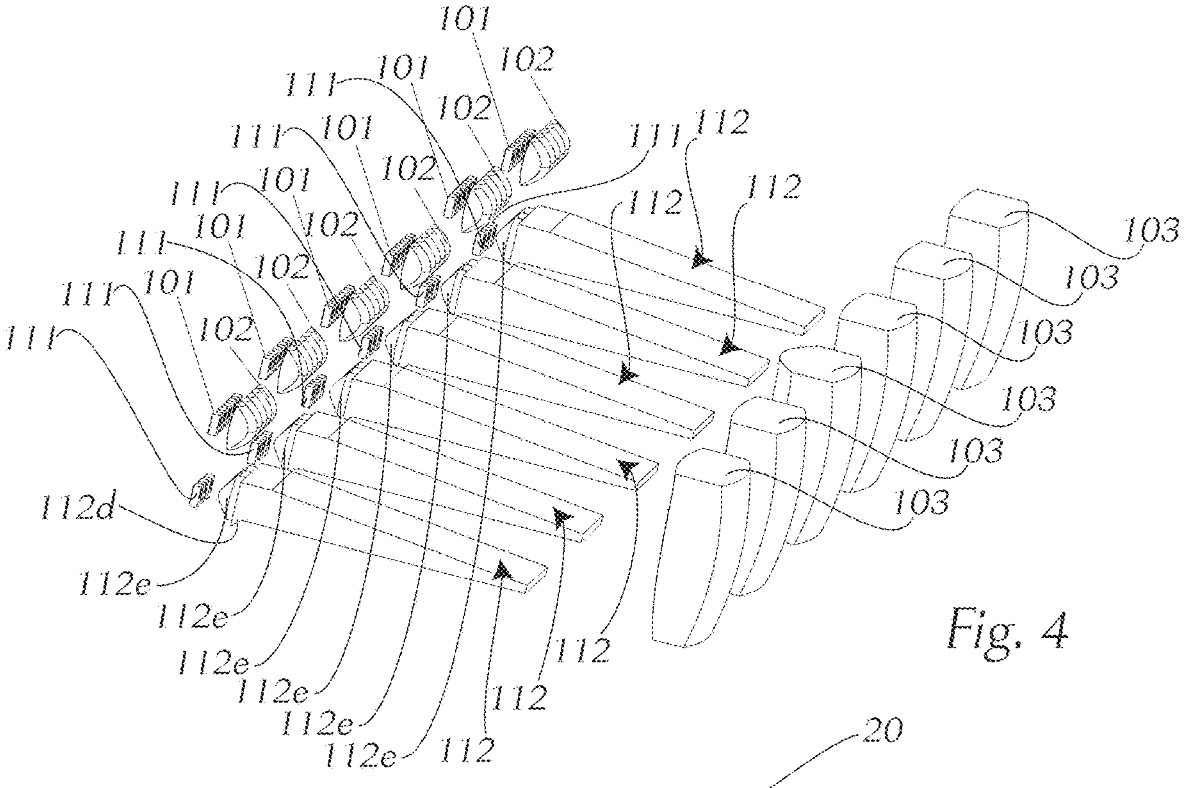
Figure 5:
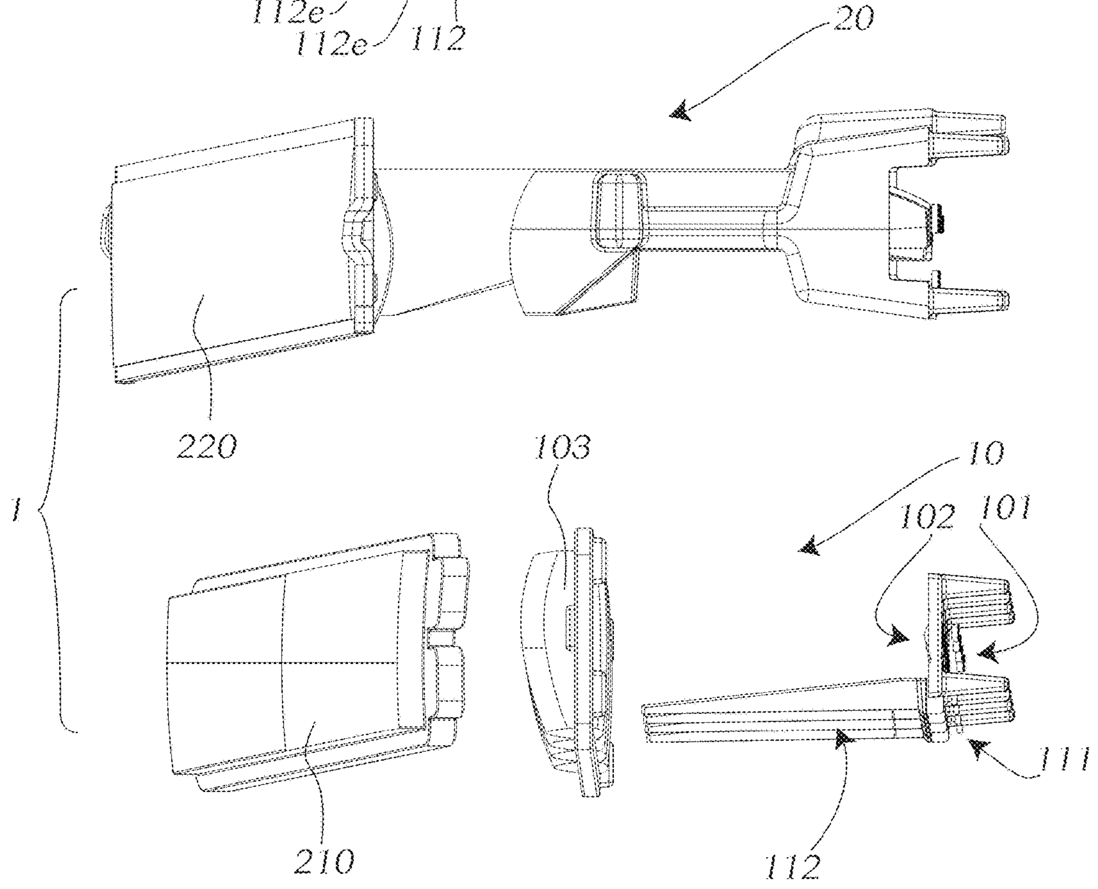
Figure 6:
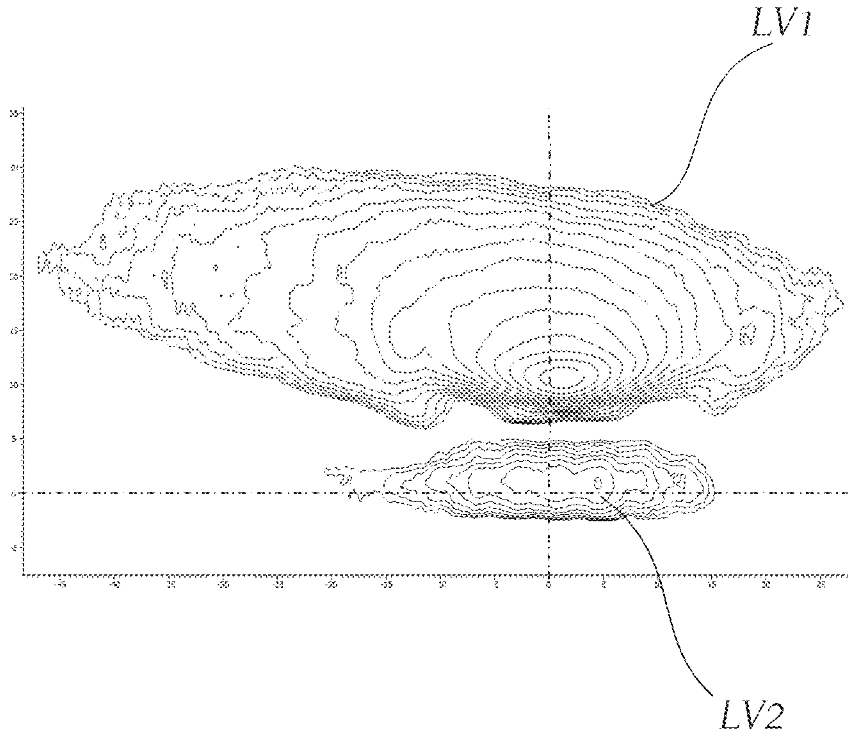
Figure 7:
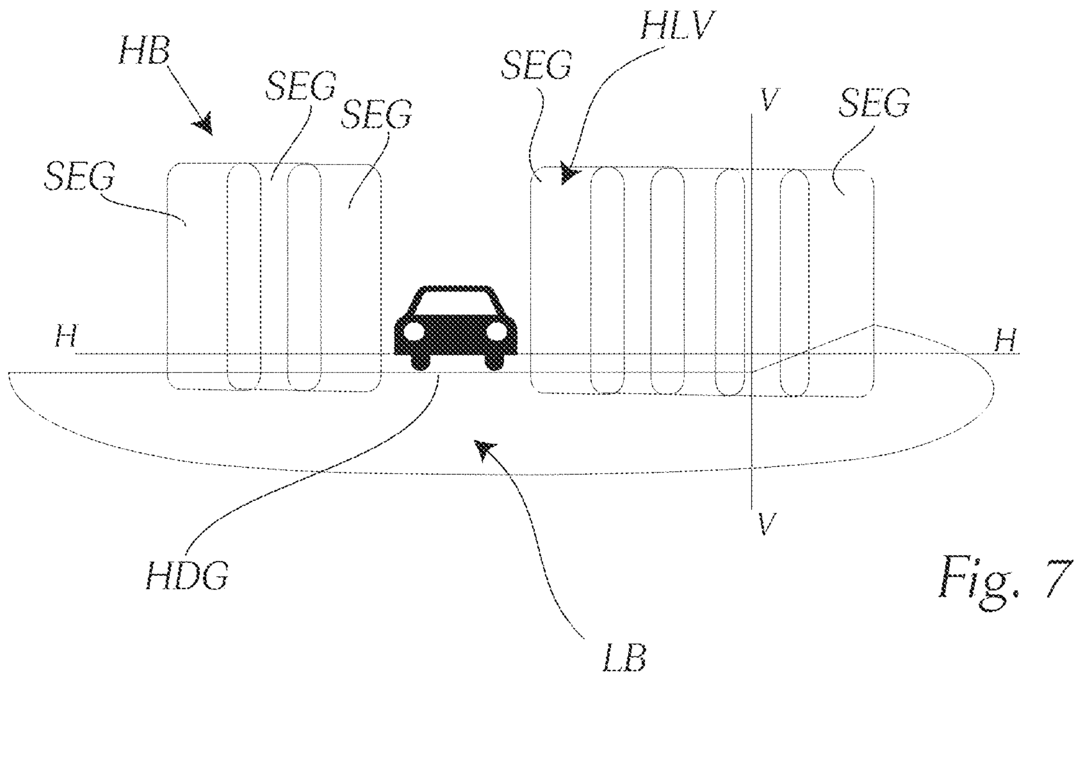

The invention is explained in more detail below with reference to the drawing:

FIG. 1 shows a high-beam module according to the invention in a perspective view from diagonally in front, FIG. 2 shows the high-beam module from FIG. 1 in a perspective view from diagonally behind, FIG. 3 schematically shows a vertical section parallel to an optical axis of the high-beam module, FIG. 4 shows a lighting device according to the invention comprising several high-beam modules, FIG. 5 shows a lighting device according to the invention with several high-beam and one low-beam module, FIG. 6 shows a light distribution generated with one or more high-beam modules, and FIG. 7 an ADB light distribution generated with a high-beam and a low-beam module.

FIGS. 1 and 2 show a high-beam lighting module 10 of a lighting device 1 for a vehicle, in particular for a motor vehicle. The high-beam lighting module 10 comprises light sources 101, so-called high beam light sources, a primary optical system 102, and a secondary optical system 103, for example a projection optics system, in particular a projection lens.

The secondary optical system 103 comprises an optical axis X, which for example, as shown, runs through a light-emitting surface 102*a* of the primary optical system 102.

In the example shown, the primary optical system 102 comprises several primary optics, such as lenses, which are formed in one part.

Each light source 101 may comprise one or more LED's.

The secondary optical system 103 is arranged downstream of the primary optical system 102 in the direction of light propagation. In the example shown, the secondary optical system 103 is in the form of a single projection lens. The secondary optical system 103 comprises an inner boundary surface 103*a* facing the primary optical system 102 and an outer boundary surface 103*b* facing away from the primary optical system 102.

Light emitted by the at least one light source 101 is coupled into the primary optical system 102, which is configured to emit the in-coupled light onto inner boundary surface 103*a* of the secondary optical system 103, which secondary optical system 103 projects said light of the at least one light source 101 as a light distribution HLV into a region in front of the lighting device 1. In the example shown, each primary optics together with its associated light source generates a light segment SEG of the light distribution HLV via the secondary optics, as shown schematically in FIG. 7. By de-activating one or more high-beam light sources, certain areas or segments in the light distribution as shown can be deactivated, i.e. no light is emitted into the respective segment so that, for example, the glare of oncoming traffic can be prevented.

The primary optical system 102 and the secondary optical system 103 are configured such that the light distribution HLV forms a part of a high-beam HB or adaptive driving beam light distribution, in particular said part of the light distribution which is close to and above the horizontal H-H-line (see FIG. 7).

Furthermore, the high-beam module 10 comprises at least one additional light source 111, and an optical transparent light guide body 112. The at least one additional light source 111 can be controlled independently of the at least one light source 101.

As shown, it may be provided that the light guide body 112 has an elongated shape with a longitudinal extension which is greater than the transverse extensions of the light guide body 112. The longitudinal extension extends preferably in the direction of the optical axis X. The light guide body 112 is bounded in longitudinal extension by boundary surfaces 112*a*, 112*b*.

The at least one additional light source 111 is configured to couple light into the optical transparent light guide body 112, which optical transparent light guide body 112 is arranged in front of the secondary optical system 103 in the direction of light propagation.

The light guide body 112 is arranged below the optical axis X of the secondary optical system 103, wherein preferably the light guide body 112 is symmetrically intersected by a vertical plane in which the optical axis X of the secondary optical system 103 lies.

Referring to FIG. 3, at least a part of the light which is coupled from the at least one additional light source 111 into the light guide body 112 propagates in the direction of a front end portion 112*c* of the light guide body 112 by means of total internal reflection (light rays L1).

One of the boundary surfaces, the upper boundary surface 112*a* comprises decoupling structures, wherein the decoupling structures are arranged and configured in such a way that light propagating in the light guide body 112 and striking the at least one upper boundary surface 112*a* emerges from the light guide body 112 and illuminates the inner boundary surface 103*a* of the secondary optical system, preferably uniformly and/or the entire inner boundary surface 103*a*, so that the secondary optical system 103 illuminates when viewed from an outside of the lighting device 1 when the at least one high beam light source 101 is switched off.

The arrangement of the light guide body 112 below the optical axis X offers the advantage that the secondary optical system 103 is illuminated from bottom to top, so that the secondary optical system 103 appears more evenly illuminated to an observer, who is generally located above the secondary optical system.

The symmetrical arrangement in relation to the optical axis X allows symmetrical illumination on both sides of the optical axis.

By activating the at least one additional light source, the secondary optical system can be illuminated when the at least one high beam light source is switched off, i.e. when the high-beam module is not intended to generate light distribution in the sense described above.

With the optically transparent light guide body, the light from the at least one additional light source is directed onto the secondary optical system and preferably illuminates it completely and uniformly, so that the secondary optical system is illuminated for an outside observer.

Preferably, the light-emitting areas of the optically transparent light guide body are arranged outside the optical axis and/or outside a focal point or a focal plane of the secondary optical system of the high-beam module, so that the light emitted by the at least one additional light source is imaged in the form of scattered light and not as a sharp light distribution.

As shown, it may be provided that the light guide body 112 tapers towards a front end portion 112*c* of the light guide body 112. Light-shading means 120 may be provided at the end portion 112*c* of the light guide body 112, to prevent the formation of a hot spot due to light being emitted in the end portion area 112*c*. The light-shading means may be applied directly to the end portion 112*c*, for example in form of an opaque mask applied to the end portion, or in form of a separate part arranged in front of the end portion.

Furthermore, as shown in FIGS. 1-3, it is of advantage when the light guide body 112 comprises a deflection section 112*d* which is arranged and configured in such a way that part of the light coupled into the light guide body 112 by the at least one additional light source 111 an incident on the deflection section 112*d* is deflected by said deflection section 112*d* in the direction of the primary optical system 102. Said light rays L2 enter the primary optical system 102. The primary optical system 102 is configured to deflect at least part of these light onto the inner boundary surface 103*a* of the secondary optical system 103.

For this purpose, boundary surfaces of the primary optical system 102, which is preferably one or more translucent, transparent bodies, are designed to be totally reflective for light originating from the light guide body 112 and entering the primary optical system 102, namely totally reflective in such a way that the light beams ultimately emerge through the light emitting surface 102*a* at least partially from the primary optical system 102 and illuminate the inner boundary surface 103*a* of the secondary optical system 103.

It can be difficult to illuminate the secondary optical system 103 (its surface 103*a*) completely and/or evenly with the light L1 emitted only via the top of the light guide body. By additionally redirecting light coupled into the light guide body towards the primary optical system of the high-beam module, which in turn redirects this light L2 at least partially towards the secondary optical system 103, the latter can be illuminated more completely and/or more evenly, so that the secondary optical system 103 appears evenly illuminated to an observer from outside.

The light guide body 112 may comprise a light coupling-in section 112*e*, via which the light emitted by the additional light source 111 is coupled into the light guide body 112, the deflection section 112*d* being arranged in the light coupling-in section 112*e*.

For example, the light coupling-in section 112*e* is designed in the form of a collimator or a to collimate the light through the light guide body 112. An in-coupling surface 112*e*' of the coupling-in section 112*e* may be grained to spread the light even more or to reduce the light intensity.

Preferably, the light guide body 112 and the primary optical system 102 are arranged with respect to each other such that the deflecting section 112*d* of the light guide body 112 is located directly below or above the primary optical system 102. The deflection section 112*d* comprises or is formed from a smooth surface, which may be flat or curved. "Smooth" in this context means that the surface has no optical structures so that incident light can be totally reflected and is not scattered.

Not limited to the specific embodiments in the figures, but valid in a general context, the following is noted: it is possible with regard to the additional light source(s) 111 to use colored light sources, in particular also different colored light sources (white, orange, turquoise, etc.). The optics used are made for example from PC (polycarbonate). The totally reflecting surfaces of the transparent light guide body may be grained, or may comprise microstructures, rills or other spreading optics to spread the light. The surface 112*a*, in the example shown the upper surface, may comprise decoupling structures in the form of microstructure, rills or other spreading optics or may be grained, so that the light can exit the light guide body 112 as described in detail above.

FIG. 4 shows a further embodiment of the invention. Here, several high-beam modules, specifically 6 high-beam modules, are arranged next to each other. The reference signs are identical to those in FIGS. 1-3, and the function of each individual module is analogous to the function described in FIGS. 1-3, which is why a more detailed discussion is dispensed with at this point.

FIG. 5 shows a lighting device 1 according to the invention, the lighting device 1—in addition to at least one high-beam module 10—further comprising at least one low-beam module 20. Each module 10, 20 may comprises an additional optical system 210, 220, for example in the form of a lens, whereby said lenses provide a slight focusing in the vertical plane and a shift of the light image in the horizontal plane.

The low-beam module 20 is configured to generate a light distribution LB with a cut-off line HDG, wherein when the at least one low-beam module 20 and at least one high-beam light source 101 of the high-beam module 10 are activated together, a main beam light distribution or an ADB light distribution is generated, and wherein when the low-beam module 20 is activated but the at least one high-beam light source 101 is not activated, the at least one additional light source 111 of the high-beam module 10 is activated.

Preferably it is provided that when the low-beam module 20 and the at least one high-beam light source 101 of the high-beam module 10 are activated together, the at least one additional light source 111 preferably is not activated.

FIG. 6 shows an example of a light distribution generated by the additional light source 111 (or several additional light sources). The light beams L1 as shown in FIG. 3 create a part of the light distribution labelled LV1, while the light beams L2 as shown in FIG. 3 illuminate the area LV2. The area LV2 lies on the horizontal H-H (0°-0°) line, the area LV1 lies above it and has a larger vertical extent.

The illumination of the secondary optical system 103 of the at least one high-beam module 10 according to the invention makes the secondary optical system 103 visible from different viewing angles, in particular from the upper viewing angles and the HV area.

The invention claimed is:

1. Lighting device (1) for a vehicle, in particular a motor vehicle, the lighting device (1) comprising at least one high-beam lighting module (10), wherein a high-beam lighting module (10) comprises at least one light source (101), a so-called high beam light source, a primary optical system (102), and a secondary optical system (103), for example a projection optics system, in particular a projection lens, wherein the secondary optical system (103) is arranged downstream of the primary optical system (102) in the direction of light propagation, wherein the secondary optical system (103) comprises an inner boundary surface (103*a*) facing the primary optical system (102) and an outer boundary surface (103*b*) facing away from the primary optical system (102), wherein light emitted by the at least one light source (101) is coupled into the primary optical system (101), which is configured to emit the in-coupled light onto inner boundary surface (103*a*) of the secondary optical system (103), which secondary optical system (103) projects said light as a light distribution (HLV) into a region in front of the lighting device (1), wherein the primary optical system (102) and the secondary optical system (103) are configured such that the light distribution (HLV) forms a part of a high-beam (HB) or adaptive driving beam, ADB, light distribution, in particular a part of said light distribution which is located close to and above a horizontal H-H-line, characterized in that the high-beam module (10) further comprises at least one additional light source (111), and an optical transparent light guide body (112), wherein the at least one additional light source (111) can be controlled independently of the at least one light source (101), and wherein the at least one additional light source (111) is configured to couple light into the optical transparent light guide body (112), which optical transparent light guide body (112) is arranged in front of the secondary optical system (103) in the direction of light propagation, wherein the optical transparent light guide body (112) is configured to emit at least part of the light coupled into the optical transparent light guide body (112) onto the inner boundary surface (103*a*) of the secondary optical system (103), so that the secondary optical system (103) illuminates when viewed from an outside of the lighting device (1) when the at least one high beam light source (101) is switched off.

2. Lighting device according to claim 1, wherein the light guide body (112) has an elongated shape with a longitudinal extension which is greater than the transverse extensions of the light guide body (112), wherein the longitudinal extension extends preferably in the direction of the optical axis (X), and wherein the light guide body (112) is bounded in longitudinal extension by boundary surfaces (112*a*, 112*b*), and wherein at least a part of the light which is coupled from the at least one additional light source (111) into the light guide body (112) propagates in the direction of a front end portion (112*c*) of the light guide body (112) by means of total internal reflection, and wherein at least one of the boundary surfaces (112*a*) comprises decoupling structures, wherein the decoupling structures are arranged and configured in such a way that light propagating in the light guide body (112) and striking the at least one boundary surface (112*a*) emerges from the light guide body (112) and illuminates the inner boundary surface (103*a*) of the secondary optical system, preferably uniformly and/or the entire inner boundary surface (103*a*).

3. Lighting device according to claim 2, wherein light-shading means (120) are provided at the end portion (112*c*) of the light guide body (112).

4. Lighting device according to claim 1, wherein the light guide body (112) is arranged below or above an optical axis (X) of the secondary optical system (103), wherein preferably the light guide body (112) is symmetrically intersected by a vertical plane in which the optical axis of the secondary optical system lies.

5. Lighting device according to claim 1, wherein the light guide body (112) comprises an upper boundary surface (112*a*), a lower boundary surface (112*b*) and a front end portion (112*c*), wherein at least a part of the light which is coupled from the at least one additional light source (111) into the light guide body (112) propagates in the direction of the end portion (112*c*) by means of total internal reflection.

6. Lighting device according to one claim 5, wherein when the light guide body (112) is arranged below the optical axis (X), decoupling structures are provided on the upper boundary surface (112*a*), and when the light guide body (112) is arranged above the optical axis (X), decoupling structures are provided on the lower boundary surface (112*b*), wherein the decoupling structures are arranged and designed in such a way that light propagating in the light guide body (112) and striking the upper or lower boundary surface (112*a*, 112*b*) emerges from the light guide body (112) and illuminates the inner boundary surface (103*a*) of the secondary optical system, preferably uniformly and/or the entire inner boundary surface (103*a*).

7. Lighting device according to claim 1, wherein the light guide body (112) tapers towards the front end portion (112*c*).

8. Lighting device according to claim 1, wherein the light guide body (112) comprises a deflection section (112*d*) which is arranged and configured in such a way that part of the light coupled into the light guide body (112) by the at least one additional light source (111) an incident on the deflection section (112*d*) is deflected by said deflection section (112*d*) in the direction of the primary optical system (102), the primary optical system (102) being set up to deflect at least part of these light onto the inner boundary surface (103*a*) of the secondary optical system (103).

9. Lighting device according to claim 8, wherein the light guide body (112) comprises a light coupling-in section (112*e*), via which the light emitted by the additional light source (111) is coupled into the light guide body (112), the deflection section (112*d*) being arranged in the light coupling-in section (112*e*).

10. Lighting device according to claim 8, wherein the light guide body (112) and the primary optical system (102) are arranged with respect to each other such that the deflecting section (112*d*) of the light guide body (112) is located directly below or above the primary optical system (102).

11. Lighting device according to claim 1, wherein the optical axis (X) of the secondary optical system (103) runs through a light-emitting surface (102*a*) of the primary optical system (102).

12. Lighting device to claim 1, further comprising at least one low-beam module (20) which is configured to generate a light distribution (LB) with a cut-off line (HDG) and/or to generate a position light/daytime running light, wherein when the at least one low-beam module (20) and at least one high-beam light source (101) of the at least one high-beam module (10) are activated together, wherein the low-beam module (20) is activated to generate the light distribution (LB) with cut-off line (HDG), a main beam light distribution or an ADB light distribution is generated, and wherein when the low-beam module (20) is activated to generate the light distribution (LB) with cut-off line (HDG) or the position light or daytime running light but the at least one high-beam light source (101) is not activated, the at least one additional light source (111) of the high-beam module (10) is activated.

13. Lighting device according to claim 12, wherein the low-beam module (20) and the high-beam module (10) are located in a common housing.

14. Lighting device according to claim 12, wherein the low-beam module (20) and the high-beam module (10) are located in separate housings.

15. Vehicle headlight, in particular motor vehicle headlight, comprising at least one lighting device (1) according to claim 1.

* * * * *